US 10,145,558 B2

(12) United States Patent
Schuermans et al.

(10) Patent No.: US 10,145,558 B2
(45) Date of Patent: Dec. 4, 2018

(54) METHOD FOR DETERMINING THE TEMPERATURE INSIDE A COMBUSTOR

(71) Applicant: Ansaldo Energia Switzerland AG, Baden (CH)

(72) Inventors: Bruno Schuermans, La Tour de Peilz (CH); Dominik Wassmer, Berlin (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 243 days.

(21) Appl. No.: 14/496,361

(22) Filed: Sep. 25, 2014

(65) Prior Publication Data
US 2015/0089950 A1    Apr. 2, 2015

(30) Foreign Application Priority Data

Sep. 27, 2013   (EP) .................................... 13186452

(51) Int. Cl.
| F23N 1/00 | (2006.01) |
| F23N 5/16 | (2006.01) |
| G01K 11/26 | (2006.01) |
| G01K 13/02 | (2006.01) |

(52) U.S. Cl.
CPC ................ *F23N 5/16* (2013.01); *G01K 11/26* (2013.01); *G01K 13/02* (2013.01); *G01K 2013/024* (2013.01); *Y02T 50/677* (2013.01)

(58) Field of Classification Search
CPC .......... F23N 5/16; F23N 5/0003; G01L 11/26; G01K 13/02; G01K 2013/024; G01K 11/265; F23R 2900/00013; F23R 2900/00014; F02C 9/28; F05D 2260/80; F01D 17/02; F01D 17/085; F01D 21/0003
See application file for complete search history.

(56) References Cited

U.S. PATENT DOCUMENTS

| 4,164,867 A | 8/1979 | Hickling et al. |
| 4,317,366 A | 3/1982 | Tewes et al. |
| 4,445,389 A | 5/1984 | Potzick et al. |
| 4,848,924 A | 7/1989 | Nuspl et al. |
| 5,624,188 A | 4/1997 | West |
| 6,481,288 B1 * | 11/2002 | Humphrey ............... G01H 5/00 73/579 |

(Continued)

FOREIGN PATENT DOCUMENTS

| CN | 1704738 A | 12/2005 |
| CN | 1837764 A | 9/2006 |

(Continued)

OTHER PUBLICATIONS

Office Action dated Feb. 26, 2018, by the Chinese Patent Office in corresponding Chinese Patent Application No. 201410501301.2, and an English Translation of the Office Action. (14 pages).

*Primary Examiner* — Craig Kim
*Assistant Examiner* — Edwin Kang
(74) *Attorney, Agent, or Firm* — Buchanan Ingersoll & Rooney PC

(57) ABSTRACT

A method for determining the temperature of an aggressive and/or abrasive gas is described using an acoustic transmitter and an acoustic receiver. The transmitter emits an acoustic signal with varying frequencies and the receiver extracts from the acoustic input signal a frequency of the maximum. Based on this the frequency of this maximum the temperature of the gas between transmitter and receiver is calculated.

8 Claims, 6 Drawing Sheets

(56) References Cited

U.S. PATENT DOCUMENTS

| | | | |
|---|---|---|---|
| 6,979,118 B1 | 12/2005 | Mick et al. | |
| 2005/0276306 A1* | 12/2005 | Mick | G01K 11/26 374/117 |
| 2006/0203877 A1 | 9/2006 | Heyman et al. | |
| 2012/0150413 A1 | 6/2012 | Bunce et al. | |
| 2013/0294475 A1* | 11/2013 | Derr | G01K 15/00 374/1 |
| 2014/0278200 A1* | 9/2014 | DeSilva | G01K 15/005 702/130 |
| 2015/0063411 A1* | 3/2015 | DeSilva | G01K 11/24 374/119 |

FOREIGN PATENT DOCUMENTS

| | | |
|---|---|---|
| FR | 2 488 991 A1 | 2/1982 |
| GB | 931 233 A | 7/1963 |
| JP | 2002266586 A | 9/2002 |
| SU | 491841 A1 | 11/1975 |

* cited by examiner

METHOD FOR DETERMINING THE TEMPERATURE INSIDE A COMBUSTOR

CROSS-REFERENCE TO RELATED APPLICATIONS

This application claims priority to European application 13186452.2 filed Sep. 27, 2013, the contents of which are hereby incorporated in its entirety.

TECHNICAL FIELD

The present invention relates to a method for determining the temperature inside a combustor, especially it refers to a dynamic acoustic measurement of fast fluctuations of hot gas temperatures.

BACKGROUND

In combustors gaseous, liquid or solid fuels and air are burnt to generate heat. The gas resulting from burning fuel with gas reaches temperatures up to 2000° C. at pressures of up to 50 bars and may comprise solid particles that are abrasive. To control the operation of the combustor the actual temperature $T_{gas}$ (t) of the gas inside the combustor has to be monitored in real time.

The above mentioned circumstances make it difficult to measure the temperature by means of thermo-elements or optical instruments.

To overcome these difficulties it is known to determine the temperature of the gas based on its sonic speed, since the temperature is a function of the sonic speed.

From U.S. Pat. No. 4,317,366 a method and system for measuring temperatures in combustion chambers is known.

This method monitors the acoustic pressure spectrum inside a combustion chamber during operation and determines based on at least one maximum of the acoustic pressure spectrum (resonance frequency) the temperature of the gas inside the chamber.

From U.S. Pat. No. 6,979,118 B1 a method for estimating combustor flame temperature is known. This method comprises the determination of the resonance frequency of the first transverse acoustic mode of the combustor and determines the temperature of the gas based on this resonance frequency.

Since these methods don't comprise active acoustic excitation their precision and significance is strongly limited. If the acoustic power spectrum is measured only passively, the highest power level in the spectrum might be found at the first transversal resonance frequency at an axial location close to the burner mouth. At this location the radial temperature distribution is strongly inhomogeneous due to areas of unburned gas and thus the measured temperature might significantly deviate from the flame temperature.

Document GB 931233 describes a temperature measurement within a resonance cavity which might be exposed to hot combustion gases. The described temperature measurement is spatially averaged over the resonance cavity length and height. Consequently, dynamic temperature measurements or real time control of a combustor is not possible with such a method. The same disadvantage is valid for the method known from U.S. Pat. No. 4,164,867.

SUMMARY

It is an objective of the claimed invention to provide a method for determining the temperature of hot gases in a combustion chamber at one particular axial position under rough conditions in real-time with high precision and reliability. Particular axial position means that the position may be any position and may be selected freely. For example, the axial position may be such that the temperature of the gas inside the combustor at this specific position is very homogenous to achieve better results. The axial position may also be such that a critical temperature of the gas that occurs a specific position may be monitored to avoid local overheating of the turbine or the like.

This objective is achieved by a method for determining the temperature of the gas at a particular axial position inside a combustor comprising an active and controllable acoustic source (transmitter) and a receiver for receiving the output of the acoustic source, said method comprising the steps of emitting an acoustic signal from the acoustic source, the acoustic signal having a frequency which is within a frequency band that comprises one resonance frequency of the gas in the combustor, receiving the acoustic signal from the acoustic source by means of the receiver and determining the actual temperature of said gas at a particular axial position based on the actual resonance frequency of said gas, wherein said acoustic source and said receiver are installed at the walls of the combustor, and wherein the combustor itself is used as the resonance cavity.

By actively generating and emitting an acoustic signal among others the following advantages are achieved:

It is possible to change the frequency of the acoustic signal generated by the transmitter within a predefined frequency band continuously.

This means that the gas inside the combustor is excited with acoustic signals of different frequencies (within the defined frequency band). This results in very clear acoustic input signal for the receiver, which may easily detect the maximum of the acoustic pressure of the input signal and thereby determining the actual resonance frequency $f_{res}$ of the gas between transmitter and receiver. This allows a very precise determination of the gas temperature at this axial location. In case that there are several transmitters and receivers installed at different axial positions, the temperatures at different positions may be monitored simultaneously.

In case that there are bad conditions, it is possible to increase the amplitude of the emitted acoustic signal resulting in a stable acoustic input signal for the receiver.

The frequency of the acoustic signal and the a. m. frequency band can easily be adapted to different combustor types and locations.

Further it is possible to simultaneously determine the local temperatures of the gas at different axial locations of the combustor, if several acoustic sources and receivers are installed at different places.

The acoustic signal may be generated by any kind of acoustic source (e.g. piezo transmitter, loudspeaker, horn, siren, air burst, electric spark, etc.)

Since the resonance frequency of the gas inside the combustor changes with temperature, it is possible to define the frequency band starting from the resonance frequency inside the combustor at normal operation as a starting point. It has been proven sufficient, if +/−10% of this resonance frequency are set as the upper and lower limit $f_{max}$ and $f_{min}$ of the frequency band. In lots of cases, the frequency band can be even smaller. The smaller the frequency band, the higher the time resolution of the determination of the gas temperature. Therefore it is often advantageous to use a small frequency band. Of course, the claimed invention is not limited to the ranges mentioned above.

By continuously changing the frequency (sweeping) of the acoustic signal that is generated by the acoustic source, it is possible to detect any change of the resonance frequency of the gas in real-time. Consequently the temperature of the gas at the particular axial position is determined in real-time, too.

By continuously changing the frequency of the acoustic signal a time resolution of up to 50 Hz has been achieved. This means that any change of the temperature is determined with nearly no delay (the delay being equal or less than 0.02 seconds). This allows a very good real-time control of the combustor.

The actual temperature Tgas (t) of the gas is determined on the basis of the following equation. This equation is valid for duct or combustion chamber with a rectangular profile with the tallest height "d". For other cross sections the equations differs a bit. Since calculating the sonic speed of a gas is well known to a man skilled in the art, the equations for other cross sections not shown in this application.

$$c = \sqrt{\gamma \frac{R}{M} T} \Rightarrow T = \frac{4 \cdot f_{res}^2 \cdot d^2 \cdot M}{\gamma R}$$

with
c being the sonic speed of the gas,
R being the universal gas constant,
γ being the heat capacity ratio,
M being the molar mass of the gas and
d being the distance between transmitter and receiver.

As mentioned above for a duct with a circular cross section duct the equation is slightly different. In case of an arbitrarily designed combustion chamber the determination of the transversal resonance frequency under conditions where the temperature is well known (e. g. cold conditions) is required, since it might be not perfectly circular or rectangular and due to the presence of several cavities (e. g. cooling holes).

This equation is easy to process in a control unit of the gas turbine and delivers precise results.

There are several options where to install the method the active acoustic source and the receiver.

It is preferred, that the acoustic signal is transmitted transverse (perpendicular to the flow direction) through the combustion chamber.

The a. m. components may be installed at the same wall of the combustor close to each other (or are identical) and the reflected acoustic waves are detected.

This arrangement compensates potential irregularities in the flow field of the gas inside the combustor. E.g. transverse flow velocities which influence the acoustic signal due to the Doppler effect are compensated and therefor do not influence the results of the claimed method.

Further the wiring is easier, since both components (transmitter and receiver) are located adjacent to each other.

To further reduce the costs for wiring, the components and their installation, the active acoustic source and the receiver may be integrated in a transceiver.

In some cases it is more advantageous to install the active acoustic source and the receiver at opposite walls of the combustor at the same axial position within the combustion chamber.

If for this arrangement transceivers are used, a redundant determination of the temperature of the gas is achieved with only little additional costs.

Further a combination of the a. m. locations may be used either depending on the geometry of the combustor and other restrictions.

The claimed method can also be used for measuring a 2-dimensional temperature field at one particular axial location by circumferentially distributing several transmitters and receivers.

The claimed method may be applied for determining the combustion temperature of each chemically aggressive and/or abrasive gas for instance, but not limit to, in a combustor of a gas turbine, a boiler of a power plant or the like.

Further advantages and details of the claimed method are illustrated in the figures and described subsequently.

DETAILED DESCRIPTION

The detected resonance frequency $f_{res}$ of the first transversal resonance (or any further transversal resonance) is a function of the sonic speed c and the known diameter of the combustion chamber d (or distance between combustion chamber walls for a rectangular chamber):

$$f_{res} = \frac{c}{2 \cdot d}$$

The sonic speed further is a function of the temperature and the gas properties, which allows calculating the temperature based on the following formula:

$$c = \sqrt{\gamma \frac{R}{M} T} \Rightarrow T = \frac{4 \cdot f_{res}^2 \cdot d^2 \cdot M}{\gamma R}$$

with
c the sonic speed of the gas inside the combustor,
R the universal gas constant,
$f_{res}$ resonance frequency, $f_{res}$ F res
γ the heat capacity ratio and
M the molar mass of the gas inside the combustor.

All terms of this equation do not change significantly during operation of a combustor, except the resonance frequency $f_{res}$. The terms that may change may be monitored separately and their changes may be compensated. If for example due to thermal expansion the distance d changes, it is possible to monitor the distance d and compensate to changes of d adequately.

This means that by determining the actual resonance frequency $f_{res}$ (t) of the gas inside a combustor, the actual temperature $T_{gas}$ (t) of the gas can be determined in real-time.

The claimed method uses a transmitter or any other active element that is capable of generating an acoustic signal.

Figure 1:
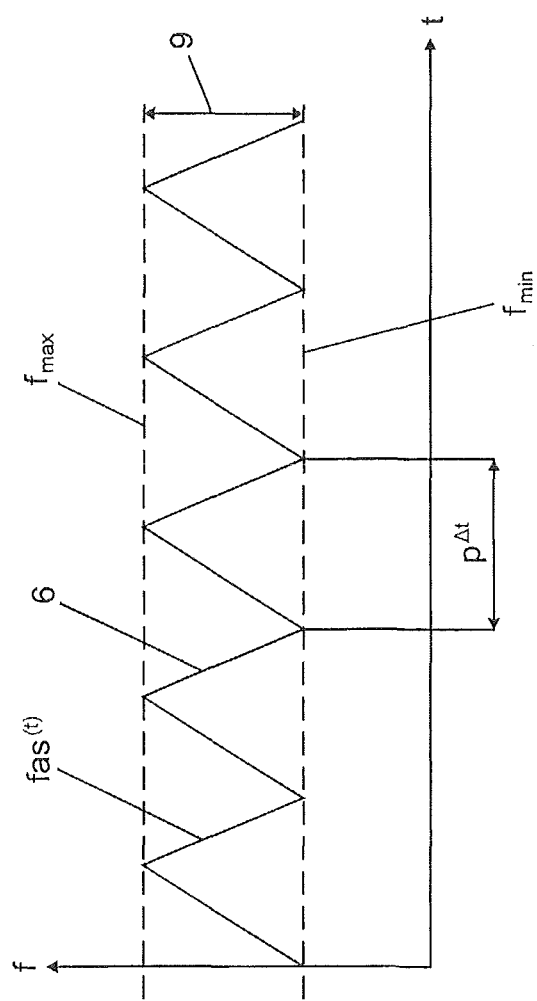
FIG. 1 shows a diagram of an output signal of a transmitter.

In FIG. 1 the frequency $f_{As}$ (t) of the acoustic signal 6 emitted by the transmitter 5 over time is illustrated. The frequency $f_{As}$ (t) remains between the limits $f_{min}$ and $f_{max}$ of a frequency band 9. The line 6 representing the change of frequency over time has a saw-toothed form.

The period Δt of these "saw-teeth" influences the time resolution of the determination of the gas temperature as will be described in more detail further below. The shorter Δt, the higher the time resolution of determining the temperature.

Figure 3:
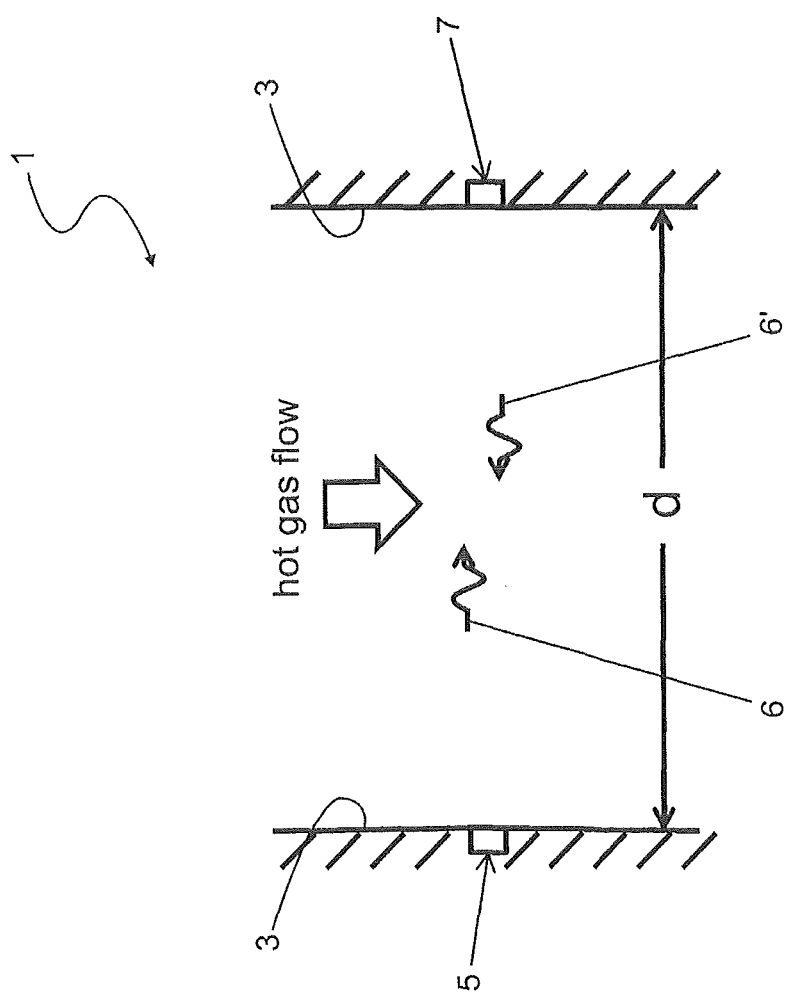
FIGS. 3 to 5 show schematic illustrations of three embodiments of combustors.

Due to the continuously changing of the frequency f of the acoustic signal 6 (also referred to as "sweeping") emitted by the transmitter 5, a receiver 7 (c. f. FIG. 3) receives a input signal with a strong and clear maximum amplitude at a the actual resonance frequency of the gas inside the combustor at one axial position depending on the temperature of the gas.

Figure 2:
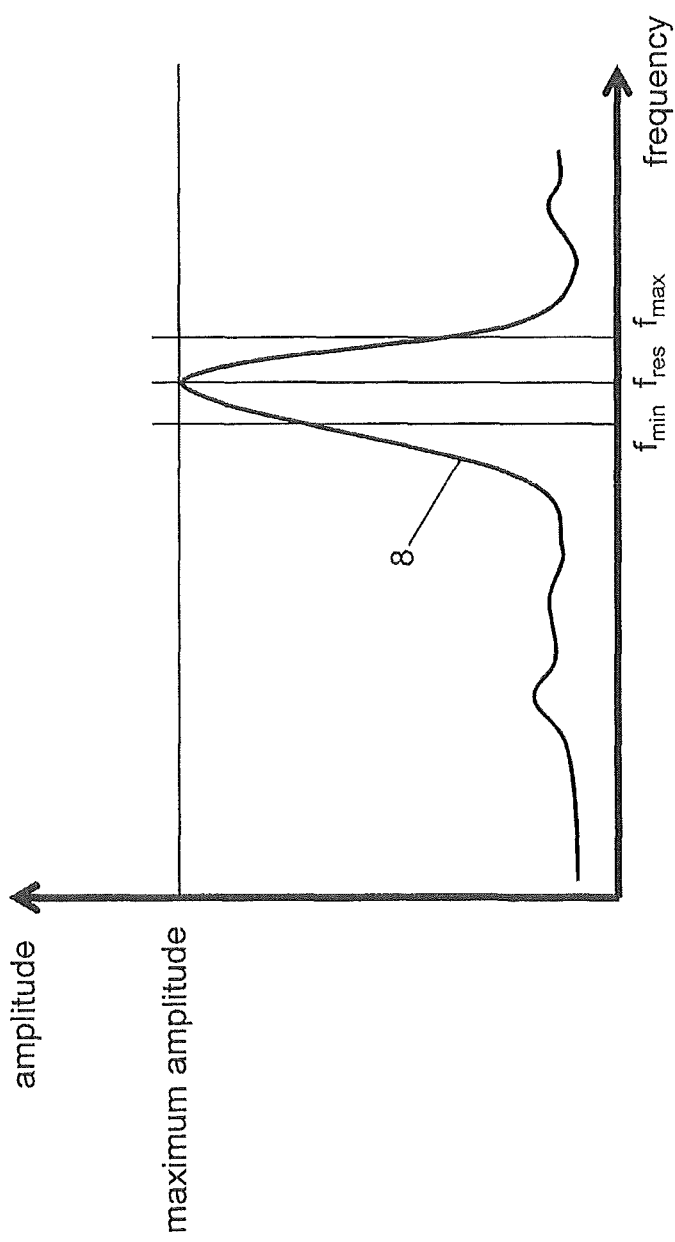
FIG. 2 shows a diagram illustrating the amplitude of an acoustic input signal of the receiver.

FIG. 2 illustrates in a schematic way an exemplary acoustic pressure spectrum of the acoustic signal 8 received by a receiver 7 (c. f. FIG. 3). It can be seen that the amplitude of the acoustic pressure input signal of the receiver 7 is a function of the frequency. The frequency of the peak is a resonance frequency $f_{res}$ of the gas inside the combustor 1.

If the temperature of the flue gas changes, the frequency $f_{res}$ changes, too. This effect is used for determining the temperature of the flue gas inside a combustor 1 at one particular axial position. Since the frequency of the acoustic signal 6 sweeps within the frequency band 9, it is guaranteed that independent from the actual gas temperature a suitable and strong acoustic signal 8 is detected by the receiver 7. Therefore the claimed method is very reliable and precise even under "difficult" operating conditions.

If necessary appropriate filters may be applied to the input signal of the receiver 7.

FIG. 3 shows a schematic cross section of a combustor 1 comprising two opposite walls 3. The walls 3 are distant from each other (c. f: reference numeral d). Between the walls 3 hot gas (for example flue gas from burned natural gas and air) flows.

At the left wall in FIG. 3 there is an acoustic transmitter 5 that emits an acoustic signal 6 into the combustor 1 as explained in conjunction with FIG. 1. The frequencies emitted by the transmitter 5 are limited by the boundaries $f_{min}$ and $f_{max}$ of the frequency band 9 (c. f. FIG. 1).

Opposed to the acoustic transmitter 5 at the other wall 3 an acoustic receiver 7 is installed. The distance between transmitter 5 and receiver 7 has the reference letter "d".

This acoustic receiver 7 receives the acoustic signal 6 emitted by the transmitter 5 that is slightly modified by the gas in the combustor. This means that the acoustic input signal 8 is not identical to the signal 6, it is changed by the gas inside the combustor 1.

As an alternative instead of an acoustic transmitter 5 a transceiver maybe installed. Doing so, the acoustic signal 6 emitted by the transceiver is reflected at the opposed wall 3 and the reflected signal 6' is received by the receiving part of the transceiver as an input signal.

In lots of cases it has been sufficient, if the tolerance band covers a range of +/−10% starting from the resonance frequency $f_{res}$ at normal operation of the combustor 1.

In lots of applications the tolerance band 9 maybe even smaller, this is resulting in a higher time resolution of the determination of changes of the gas temperatures.

Figure 4:
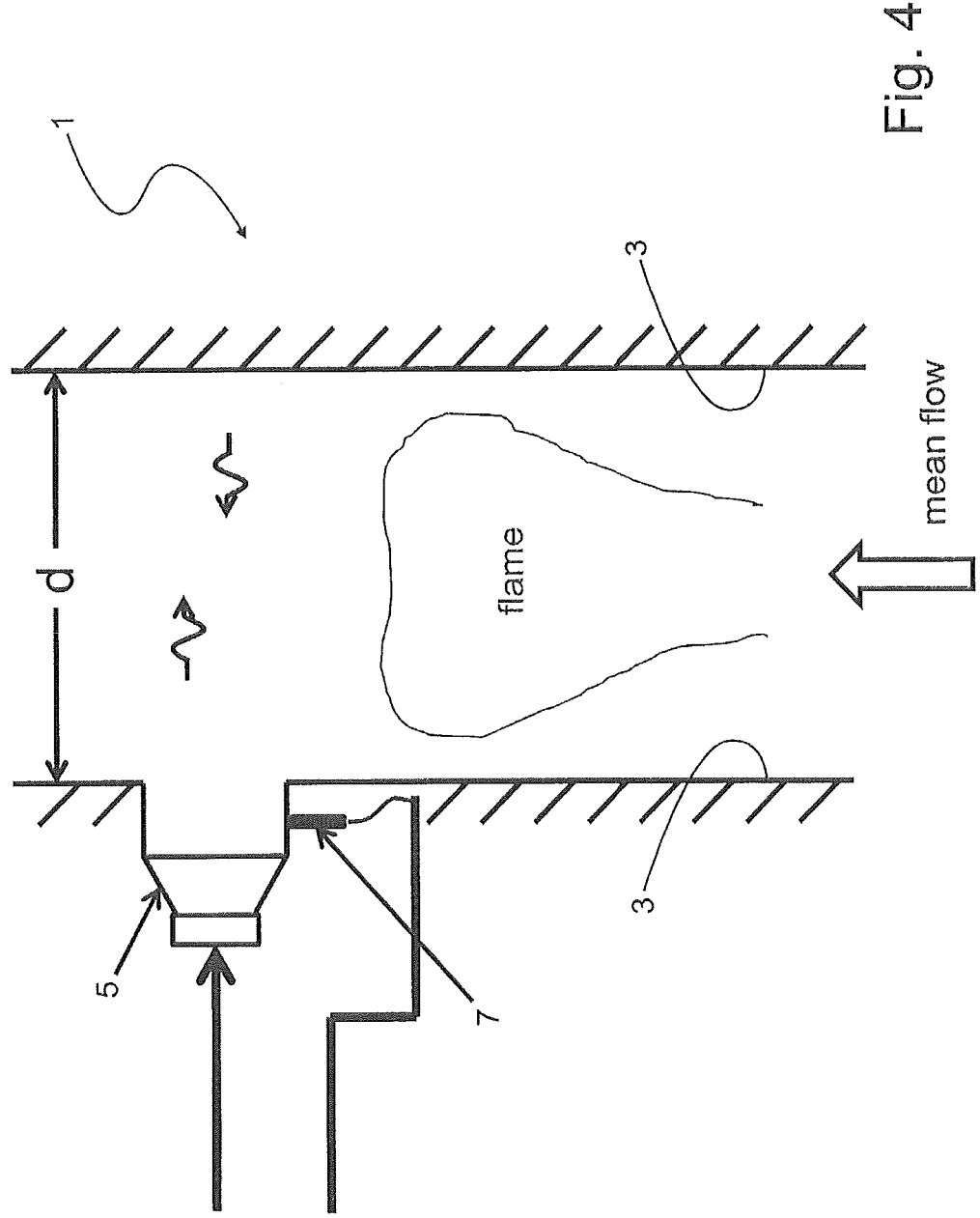

In FIG. 4 a further embodiment of the claimed invention is shown. In this embodiment the acoustic transmitter 5 and the acoustic receiver 7 are located at the same wall 3 of the combustor. With this arrangement some negative influences of the Doppler effect due to a gas flow non-transversal to the main direction of the acoustic signal 6 may be eliminated.

Figure 5:
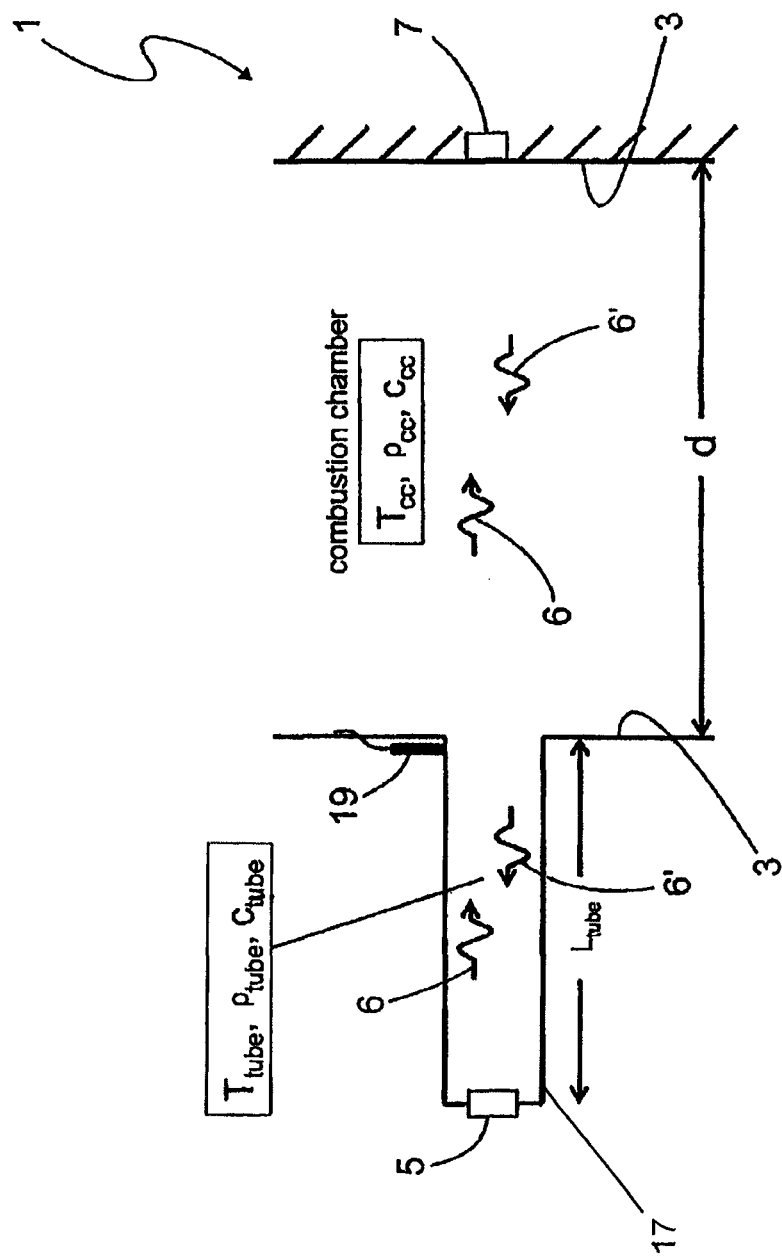

In FIG. 5 a further embodiment of a combustor is shown. In this embodiment the transmitter 5 is not directly located at the wall 3 of the combustor 1, but at the end of a tube 17. Inside the tube 17 the properties of the gas (for example density and temperature) are different from those of the gas inside the combustor 1.

Therefore, at the entrance of the tube 17 a further acoustic receiver and/or temperature measurement probe 19 is installed. By using the signals from the further acoustic receiver and/or temperature measurement probe 19 and the specific dimensions and properties (for example, temperature T, density ρ and sonic speed) of the gas it is possible to quantify the effects of the gas inside the tube on the results of the claimed method and to compensate them, if required.

To receive a strong and clear acoustic signal a length L of the tube 17 is preferably set at a value that causes resonances at a certain frequency, e.g. quarter wave resonance. This frequency of the tube 17 also has to meet the first transversal resonance $f_{res}$ of the combustion chamber 1. This results in an amplification of the transmitted signal 6.

Care has to be taken for monitoring the temperature within tube 17 via temperature measurement device 19 (e.g. thermocouple, etc.) and needs to be compensated in the calculation of the temperature in the combustion chamber. Further additional acoustic receivers (not shown) might be placed at the mouth of the tube 17 towards the combustion chamber 1 to record transmitted signal 6 and reflected signal 6'.

The connecting tube 17 might be cooled (e.g. water cooling of the walls, purging with cooling air). This results in a reduced heat impact on transmitter 5, receiver 7 and/or device 19.

If the tube 17 is purged with air, the Doppler effect need to be considered and/or compensated.

Due to temperature changes, the distance between the transmitter and the receiver/reflecting wall might vary. To compensate these effects on the determination of the temperature of the gas, instantaneous, preferably laser based distance measurement or any other feasible kind of distance measurement device, provides the current distance d between the transmitter 5 and the receiver 7 or the reflecting wall 3 for a more precise calculation of the sonic speed c.

Figure 6:
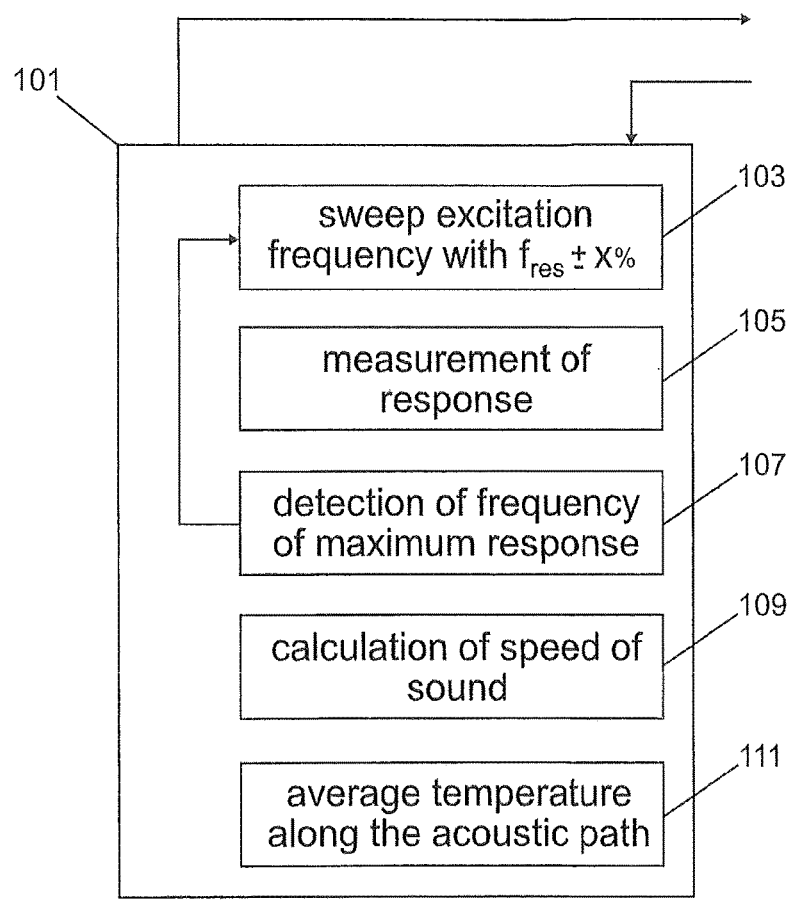
FIG. 6 shows a sketch of a control algorithm of the claimed method and
FIG. 7 shows a black box illustration of a transceiver.

In FIG. 6 a flow diagram of a control algorithm 101 or of the claimed method is illustrated as a block diagram.

Block 101 depicts the connection between the claimed method and the related hardware; i. e. transmitter 5 and receiver 7 by two arrows without reference numerals.

In block 103 the excitation frequency f emitted by the transmitter 5 is calculated and submitted to the transmitter 5, enabling the transmitter 5 to generate a "sweeping" acoustic output signal 6 of appropriate frequency and magnitude as described in FIG. 1.

Further in block 105 the signal the receiver 7 receives the acoustic input signal. This acoustic input signal is analyzed in block 107. More specifically, in block 107 the frequency $f_{res}$ of the maximum amplitude of the acoustic input signal received by the receiver 7 is calculated.

Based on the frequency of the maximum response, which is equal to the resonance frequency $f_{res}$ (t), in block 109 the sonic speed c of the gas is calculated and in a further block 111 the average temperature along the acoustic path between acoustic transmitter 5 and an acoustic receiver 7 is calculated.

These steps are iteratively executed. The more often the steps 103 to 107 are executed in a given time period, the higher the time resolution of the claimed temperature determination.

The transmitter 5, which is fed by an electric signal generator, generates acoustic signal as a sweep signal following an algorithm such that the minimum and maximum frequency of the sweep are always a fixed value of percentage x smaller/greater than the actual resonance frequency $$f_{min} = f_{res} - \frac{x}{100}; f_{max} = f_{res} + \frac{x}{100}$$

$$f_{min} = f_{res} - \frac{x}{100}; f_{max} = f_{res} + \frac{x}{100} f_{res}$$

Alternatively this equation may be amended by replacing the term "X/100" in percent.

The actual resonance frequency $f_{res}$ (t) is recorded by the receiver 7 at opposite side of the acoustic transmitter 7 (c. f. FIG. 3) and/or the reflected wave is recorded by the transmitter 5 (acting as transceiver) or a receiver 7 close to the transmitter 5 (c. f. FIG. 4).

Figure 7:
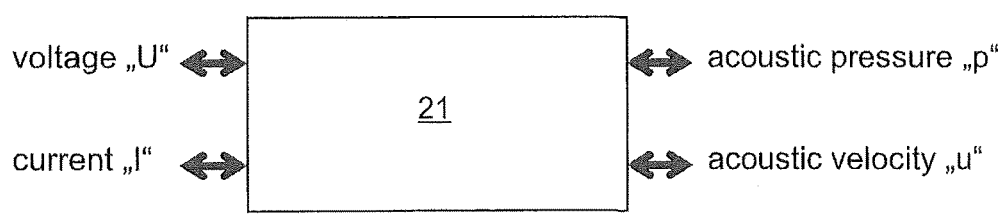

The detection of the resonance frequency is permanently executed which allows a high time resolution of the temperature measurement In FIG. 7 transceiver 21, comprising a transmitter 5 and a receiver 7, is illustrated. The transceiver 21 is modeled by means of the transfer function with two input/output parameters U: Voltage
I: Current,
p: acoustic pressure and
u: acoustic velocity (not equal to "speed of sound")

These parameters are measured and based on these parameters the electric impedance $Z_{electric}$=U/I and the acoustic impedance $Z_{acoustic}$=p/u are calculated.

Based on the impedances $Z_{electric}$ and $Z_{acoustic}$ the resonance frequency phase change can be determined. This allows a redundant determination of the temperature, too and therefore a result of the claimed method can be checked or confirmed by this additional method. This additional method does not need additional equipment.

Additionally the detection of the time of flight (TOF) or phase shift between transmitted signal and received signal at the resonance frequency can be carried out in parallel for validation of the results of the claimed method.

Because of direct applying the acoustic measurement method to the combustion chamber, that means, because of using the combustion chamber as resonance cavity, the temperature of the hot gases can be measured with a very high time resolution (up to 100 Hz). The present application allows measuring the temperature at a very distinct axial location in the combustion chamber, avoiding a spatially averaged temperature measurement.

The invention claimed is:

1. A method for determining a combustion temperature in a combustor of a gas turbine by acoustic measurements, the combustor having an active acoustic source, a receiver for receiving an acoustic signal of the active acoustic source across a resonance cavity, the active acoustic source arranged in a tube formed on a wall of a plurality of walls of the combustor, the tube opening into the combustor, and a temperature measurement probe configured to measure a sensed temperature of a gas in the tube, said method comprising:

emitting the acoustic signal from the active acoustic source, the acoustic signal having a frequency that is continuously changed and is within a frequency band that comprises one resonance frequency ($f_{res}$ (t)) of said gas in the combustor;
receiving the acoustic signal from the active acoustic source by the receiver;
measuring the sensed temperature of said gas in the tube by the temperature measurement probe; and
determining a calculated temperature ($T_{gas}$ (t)) of said gas at a particular axial position based on the one resonance frequency ($f_{res}$ (t)) of said gas, wherein the combustor itself is used as the resonance cavity.

2. The method according to claim 1, wherein the frequency band covers a range of +−10% of the one resonance frequency ($f_{res}$ (t)) during operation of the combustor.

3. The method according to claim 1, wherein the calculated temperature ($T_{gas}$ (t)) of said gas is determined on an equation for the tube or the combustor having a rectangular profile:

$$c = \sqrt{\gamma \frac{R}{M} T_{gas}(t)} \rightarrow T_{gas}(t) = \frac{4 * f_{res}(t)^2 * d^2 * M}{\gamma * R}$$

with
d being a distance the acoustic signal travels between the active acoustic source and the receiver,
c being a sonic speed of said gas,
R being a universal gas constant,
γ being a heat capacity ratio, and
M being a molar mass of said gas.

4. The method according to claim 1, wherein the active acoustic source and the receiver are installed at a same wall of the plurality of walls of the combustor.

5. The method according to claim 3, wherein the active acoustic source and the receiver are part of a transceiver.

6. The method according to claim 1, wherein the active acoustic source and the receiver are installed at opposite walls of the plurality of walls of the combustor.

7. A non-transitory computer readable medium storing computer program instructions which when executed by a computer programmed with the computer program instructions causes the computer to perform a method for determining a combustion temperature in a combustor of a gas turbine by acoustic measurements, the combustor having an active acoustic source, a receiver for receiving an acoustic signal of the active acoustic source, the active acoustic source arranged in a tube formed on a wall of a plurality of walls of the combustor, the tube opening into the combustor, and a temperature measurement probe configured to measure a sensed temperature of a gas in the tube, said method comprising:

emitting the acoustic signal from the active acoustic source, the acoustic signal having a frequency that is continuously changed and which is within a frequency band that comprises one resonance frequency ($f_{res}$ (t)) of said gas in the combustor;
receiving the acoustic signal from the active acoustic source by the receiver;
measuring the sensed temperature of said gas in the tube by the temperature measurement probe; and
determining a calculated temperature ($T_{gas}$ (t)) of said gas at a particular axial position based on the one resonance frequency ($f_{res}$ (t)) of said gas, wherein the combustor itself is used as the resonance cavity.

8. A control unit for controlling a combustor of a gas turbine, by performing a method for determining a combustion temperature in a combustor of a gas turbine by acoustic measurements, the combustor having an active acoustic source, a receiver for receiving an acoustic signal of the active acoustic source across a resonance cavity, the active acoustic source arranged in a tube formed on a wall of a plurality of walls of the combustor, the tube opening into the combustor, and a temperature measurement probe configured to measure a sensed temperature of a gas in the tube, said method comprising:

emitting the acoustic signal from the active acoustic source, the acoustic signal having a frequency that is continuously changed and is within a frequency band that comprises one resonance frequency ($f_{res}(t)$) of said gas in the combustor;

receiving the acoustic signal from the active acoustic source by the receiver;

measuring the sensed temperature of said gas in the tube by the temperature measurement probe; and determining a calculated temperature ($T_{gas}(t)$) of said gas at a particular axial position based on the resonance frequency ($f_{res}(t)$) of said gas, wherein the combustor itself is used as the resonance cavity.

\* \* \* \* \*